(12) United States Patent
Maker et al.

(10) Patent No.: US 11,276,980 B2
(45) Date of Patent: Mar. 15, 2022

(54) METHOD AND APPARATUS FOR REPETITION RATE SYNCHRONISATION OF MODE-LOCKED LASERS

(71) Applicant: M SQUARED LASERS LIMITED, Glasgow (GB)

(72) Inventors: Gareth Thomas Maker, Glasgow (GB); Graeme Peter Alexander Malcolm, Glasgow (GB); Lukasz Kornaszewski, Glasgow (GB)

(73) Assignee: M SQUARED LASERS LIMITED, Glasgow (GB)

( * ) Notice: Subject to any disclaimer, the term of this patent is extended or adjusted under 35 U.S.C. 154(b) by 0 days.

(21) Appl. No.: 16/462,141

(22) PCT Filed: Nov. 14, 2017

(86) PCT No.: PCT/GB2017/053427
§ 371 (c)(1),
(2) Date: May 17, 2019

(87) PCT Pub. No.: WO2018/091800
PCT Pub. Date: May 24, 2018

(65) Prior Publication Data
US 2019/0334309 A1 Oct. 31, 2019

(30) Foreign Application Priority Data
Nov. 17, 2016 (GB) .................................. 1619462.3

(51) Int. Cl.
*H01S 3/00* (2006.01)
*H01S 3/10* (2006.01)
(Continued)

(52) U.S. Cl.
CPC ........ *H01S 3/0071* (2013.01); *H01S 3/08054* (2013.01); *H01S 3/10061* (2013.01); *H01S 3/1118* (2013.01); *H01S 3/1625* (2013.01)

(58) Field of Classification Search
CPC ............... H01S 3/0071; H01S 3/08054; H01S 3/10061; H01S 3/2391; H01S 3/1112; H01S 3/2383; H01S 3/10092
See application file for complete search history.

(56) References Cited

U.S. PATENT DOCUMENTS

| 4,914,663 A | 4/1990 | Basu et al. | |
|---|---|---|---|
| 5,265,109 A * | 11/1993 | Knox | ................ H01S 3/094026 372/18 |

(Continued)

OTHER PUBLICATIONS

International Search Report dated Mar. 9, 2018.
(Continued)

*Primary Examiner* — Yuanda Zhang
(74) *Attorney, Agent, or Firm* — FisherBroyles, LLP

(57) ABSTRACT

A method and apparatus for passively synchronising the repetition rate of two or more mode-locked lasers is described. The method and apparatus involve forming a first synchronising optical field (6) by separating a portion of an output field of a first mode-locked laser (2) and thereafter redirecting this synchronising optical field to form a driving signal for a second mode-locked laser (3). Employing these techniques results in systems with timing jitter of less than 1 fs. The method is independent of the wavelength and polarisation at which the mode-locked lasers operate and so is not limited to use with any particular type of mode-locked laser. Since the technique is passive it does not require the employment of electronics, variable time delay paths or additional non-linear optical crystals. Therefore, the method and apparatus are significantly less complex than those known in the art and are not power limited by additional (Continued)

non-linear optical processes. Part of the output (7) of the first mode-locked laser (2) is redirected via a beam splitter (9) and beam steering mirrors (11,12) and a half-wave plate (15) to a polariser (13) in the beam line of the second mode-locked laser (3). The seeding and synchronising signal from the first mode-locked laser (2) may be perpendicularly polarized with respect to the polarization of the second mode-locked laser (3) and may have a different wavelength.

44 Claims, 4 Drawing Sheets

(51) Int. Cl.
    *H01S 3/11*         (2006.01)
    *H01S 3/16*         (2006.01)
    *H01S 3/08*         (2006.01)

(56) References Cited

U.S. PATENT DOCUMENTS

| | | | |
|---|---|---|---|
| 6,687,270 B1 * | 2/2004 | Robertson, III | H01S 3/139 372/18 |
| 2003/0197917 A1 * | 10/2003 | Yap | G02F 2/002 359/330 |
| 2005/0013524 A1 | 1/2005 | Arahira | |
| 2007/0263681 A1 | 11/2007 | Yoshitomi et al. | |
| 2012/0154062 A1 | 6/2012 | Wilkinson et al. | |

OTHER PUBLICATIONS

Naoya Kuse et al: Passive synchronization of repetition and offset frequency between two mode-locked Yb-doped fiber lasers11 , Lasers and Electro-Optics (CLEO), Laser Science—to Photonic Applications)—CLEO: 2011 Laser Science to Photonic Applications—May 1-6, 2011, Baltimore, MD, USA, IEEE, us, May 1, 2011 (May 1, 2011), pp. 1-2, XP031892070, ISBN: 978-1-4577-1223-4.

Kim J et al: Coherent spectral bandwidth combining by optical pulse injection locking in quantum dot modelocked semiconductor diode lasers11 , Electronics Let, IEE Stevenage, GB, vol. 48, No. 12, Jun. 7, 2012 (Jun. 7, 2012), pp. 720-721, XP006040940, ISSN: 0013-5194, DOI: 10.1049/EL.2012.1280 p. 720, left-hand column paragraph 2—p. 721, left-hand column paragraph 1; figures 1-4.

Lijun Wang et al: Polarization insensitive widely tunable all-optical clock recovery based on AM mode-locking of a fiber ring laser11 , IEEE Photonics Technology Letters, IEEE Service Center, Piscataway, NJ, US, vol. 12, No. 2, Feb. 1, 2000 (Feb. 1, 2000), pp. 211-213, XP011426122,ISSN: 1041-1135, DOI: 10.1109/68.823520 p. 211, left-hand column, paragraph 2—p. 213, left-hand column, paragraph 2; figures 1-4.

* cited by examiner

METHOD AND APPARATUS FOR REPETITION RATE SYNCHRONISATION OF MODE-LOCKED LASERS

This application is the U.S. National Stage of International Application No. PCT/GB2017/053427, which was filed on Nov. 14, 2017. This application also claims the benefit of the filing date of GB patent application No. 1619462.3, which was filed on Nov. 17, 2016. The contents of both of those applications are hereby incorporated by reference in its entirety.

The present invention relates to the field of lasers and, in particular, to a method and apparatus for repetition rate synchronisation of two or more mode-locked lasers.

The invention of Kerr-lens mode-locked (KLM) lasers has revolutionised research and development in ultra short pulsed light sources. The term "ultra short" pulses as used within the following description refers to pulses having a duration from about 100 picoseconds (ps) down to a few femtoseconds (fs). This technique has been successfully applied to many solid-state lasers, such as Titanium-doped sapphire (Ti:sapphire), Ytterbium-doped potassium gadolinium tungstate (Yb:KGW), Chromium-doped forsterite (Cr:forsterite) and Chromium-doped yttrium aluminium garnet (Cr:YAG$^3$). These femtosecond lasers generate outputs at different wavelengths and so offer spectroscopy researchers with a choice of instruments for various purposes.

The ability to synchronise the repetition rate of two or more laser sources operating at different wavelength is a highly desirable development of the above described mode-locked laser sources. Optics Letters, Volume 20, Number 8, pages 916 to 918 describes a tunable two-colour mode-locked Ti:sapphire laser with pulse jitter of less than 2 femtoseconds. The described systems however share a single gain medium and thus laser performance, especially efficiency, becomes compromised by the need to satisfy the synchronisation requirement of having a large overlap between the beams. A further drawback of the described system is the need to employ and align two independent pump beams.

An alternative technique for synchronising the repetition rate of a Ti:sapphire laser and Cr:forsterite laser is disclosed in Optics Letters, Volume 28, Number 11, pages 947 to 949. This technique is based on employing electrical feedback signals to synchronise the two independent laser cavities. The disclosed techniques are extremely complex and generally require the employment of complicated balanced cross-correlators. Such systems are known to still exhibit the problematic features of relatively high timing jitter and random relative time delay.

A technique for passively synchronising a Ti:sapphire laser and Cr:forsterite laser is disclosed in Optics Letters, Volume 26, Number 22, pages 1806 to 1808. A similar technique is described in Optics Letters, Volume 30, Number 16, pages 2161 to 2163 to passively synchronise two Ti:sapphire lasers. This technique is realised by coupling the two independent mode-locked laser cavities with an additional Kerr medium. Although simpler than the above described electrical feedback signal techniques these systems require specific cavity designs in which the coupling medium significantly adds to the complexity of the disclosed systems thus limiting their design flexibility.

SUMMARY OF INVENTION

It is therefore an object of an embodiment of the present invention to obviate or at least mitigate the foregoing disadvantages of the methods and apparatus for synchronising mode-locked lasers known in the art.

According to a first aspect of the present invention there is provided method for synchronising a repetition rate of two or more mode-locked lasers, the method comprising:
forming a first synchronising optical field by separating a first portion of an output field of a first mode-locked laser of the of two or more mode-locked lasers; and
redirecting the first synchronising optical field to form an optical driving signal for a second mode-locked laser of the of two or more mode-locked lasers.

The above method allows for passive synchronisation of the repetition rate of two or more mode-locked lasers to be achieved with timing jitter of less than 1 fs. The method is independent of the wavelengths at which the mode-locked lasers are operating. This means that the method is not limited to use with any particular combination of mode-locked laser type. As the method and apparatus is passive it does not require the employment of any electronics, moving parts or additional external generation of a feedback signal. As a result, the method is significantly less complex than those known in the art and is not power limited by additional nonlinear optical processes.

Preferably the first synchronising optical field is redirected into the second mode-locked laser via an output coupler or end mirror of the second mode-locked laser. Alternatively, the first synchronising optical field is redirected into the second mode-locked laser via an intracavity element of the second mode-locked laser e.g. a Brewster plate or other partially reflecting optical component.

The output fields of the two or more mode-locked lasers preferably have the same polarisation. Preferably, the output fields of the two or more mode-locked lasers are linearly polarised.

Most preferably a polarisation of the first synchronising optical field is the same as the polarisation as the output field of the first mode-locked laser.

Optionally redirecting the first synchronising optical field further comprises varying the polarisation of the first synchronising optical field. Most preferably varying the polarisation of the first synchronising optical field comprises rotating the polarisation of the first synchronising optical field through 90°.

Most preferably the method further comprises forming one or more additional synchronising optical fields by separating one or more additional portions of the output field of the first mode-locked laser.

Preferably the method further comprises redirecting the one or more additional synchronising optical fields to form a driving signal for one or more additional mode-locked lasers.

Preferably the one or more additional synchronising optical fields are redirected into the one or more additional mode-locked lasers via an output coupler or end mirror of the one or more additional mode-locked lasers. Alternatively, the one or more additional synchronising optical fields are redirected into the one or more additional mode-locked lasers via an intracavity element of the one or more additional mode-locked lasers e.g. a Brewster plate or other partially reflecting optical component.

Most preferably a polarisation of the one or more additional synchronising optical fields is the same as the polarisation of the output field of the first mode-locked laser.

Optionally redirecting the one or more additional synchronising optical fields further comprises varying the polarisation of the one or more additional synchronising optical fields. Most preferably varying the polarisation of the one or more additional synchronising optical fields comprises rotating the polarisation of one or more of the additional synchronising optical fields through 90°.

Alternatively, the method further comprises forming an nth synchronising optical field by separating a first portion of an output field of the nth mode-locked laser, wherein n is an integer greater than 1.

Preferably the method further comprises redirecting the nth synchronising optical field to form a driving signal for an nth+1 mode-locked laser.

Most preferably a polarisation of the nth synchronising optical field is the same as the polarisation of the output field of the nth mode-locked laser.

Optionally redirecting the nth synchronising optical field further comprises varying the polarisation of the nth synchronising optical field. Most preferably varying the polarisation of the nth synchronising optical field comprises rotating the polarisation of the nth synchronising optical field through 90°.

According to a second aspect of the invention there is provided a repetition rate synchronised mode-locked laser system, the system comprising: two or more mode-locked lasers each of which generates an output field; a beam splitter that provides a means for forming a first synchronising optical field by separating a first portion of an output field of a first mode-locked laser of the of two or more mode-locked lasers; and one or more beam steering optics that provide a means for redirecting the first synchronising optical field to form an optical driving signal for a second mode-locked laser of the of two or more mode-locked lasers.

Preferably the first synchronising optical field is redirected into the second mode-locked laser via an output coupler or end mirror of the second mode-locked laser. Alternatively, the first synchronising optical field is redirected into the second mode-locked laser via an intracavity element of the second mode-locked laser e.g. a Brewster plate or other partially reflecting optical component.

The output fields of the two or more mode-locked lasers preferably have the same polarisation. Preferably, the output fields of the two or more mode-locked lasers are linearly polarised.

Most preferably a polarisation of the first synchronising optical field is the same as the polarisation as the output field of the first mode-locked laser.

Optionally the repetition rate synchronised mode-locked laser system further comprises a waveplate that provides a means for varying the polarisation of the first synchronising optical field. Most preferably the waveplate comprises a half-wave plate.

Optionally the repetition rate synchronised mode-locked laser system further comprises one or more additional beam splitters that provide a means for forming one or more additional synchronising optical fields by separating one or more additional portions of the output field of the first mode-locked laser.

Preferably the repetition rate synchronised mode-locked laser system further comprises one or more beam steering optics that provide a means for redirecting the one or more additional synchronising optical fields to form a driving signal for one or more additional mode-locked laser.

Preferably the one or more additional synchronising optical fields are redirected into the one or more additional mode-locked lasers via an output coupler or end mirror of the one or more additional mode-locked lasers. Alternatively, the one or more additional synchronising optical fields are redirected into the one or more additional mode-locked lasers via an intracavity element of the one or more additional mode-locked lasers e.g. a Brewster plate or other partially reflecting optical component.

Most preferably a polarisation of the one or more additional synchronising optical fields is the same as the polarisation of the output field of the first mode-locked laser.

Optionally the repetition rate synchronised mode-locked laser system further comprises one or more additional waveplates that provide a means for varying the polarisation of the one or more additional synchronising optical fields. Most preferably the one or more additional waveplates comprise half-wave plates.

Alternatively, the repetition rate synchronised mode-locked laser system further comprises one or more additional beam splitters that provide a means for forming an nth synchronising optical field by separating a first portion of an output field of the nth mode-locked laser, wherein n is an integer greater than 1.

Preferably the repetition rate synchronised mode-locked laser system further comprises one or more beam steering optics that provide a means for the nth synchronising optical field to form a driving signal for an nth+1 mode-locked laser.

Preferably the nth synchronising optical field is redirected into the nth+1 mode-locked laser via an output coupler or end mirror of the nth+1 additional mode-locked laser. Alternatively, the nth synchronising optical field is redirected into the nth+1 mode-locked laser via an intracavity element of the one or more additional mode-locked lasers e.g. a Brewster plate or other partially reflecting optical component.

Most preferably a polarisation of the nth synchronising optical fields is the same as the polarisation of the output field of the nth mode-locked laser.

Optionally the repetition rate synchronised mode-locked laser system further comprises one or more additional waveplates that provide a means for varying the polarisation of the nth synchronising optical fields. Most preferably the one or more additional waveplates comprise half-wave plates.

Embodiments of the second aspect of the invention may comprise features to implement the preferred or optional features of the first aspect of the invention or vice versa.

BRIEF DESCRIPTION OF DRAWINGS

There will now be described, by way of example only, various embodiments of the invention with reference to the drawings, of which.

Figure 1:
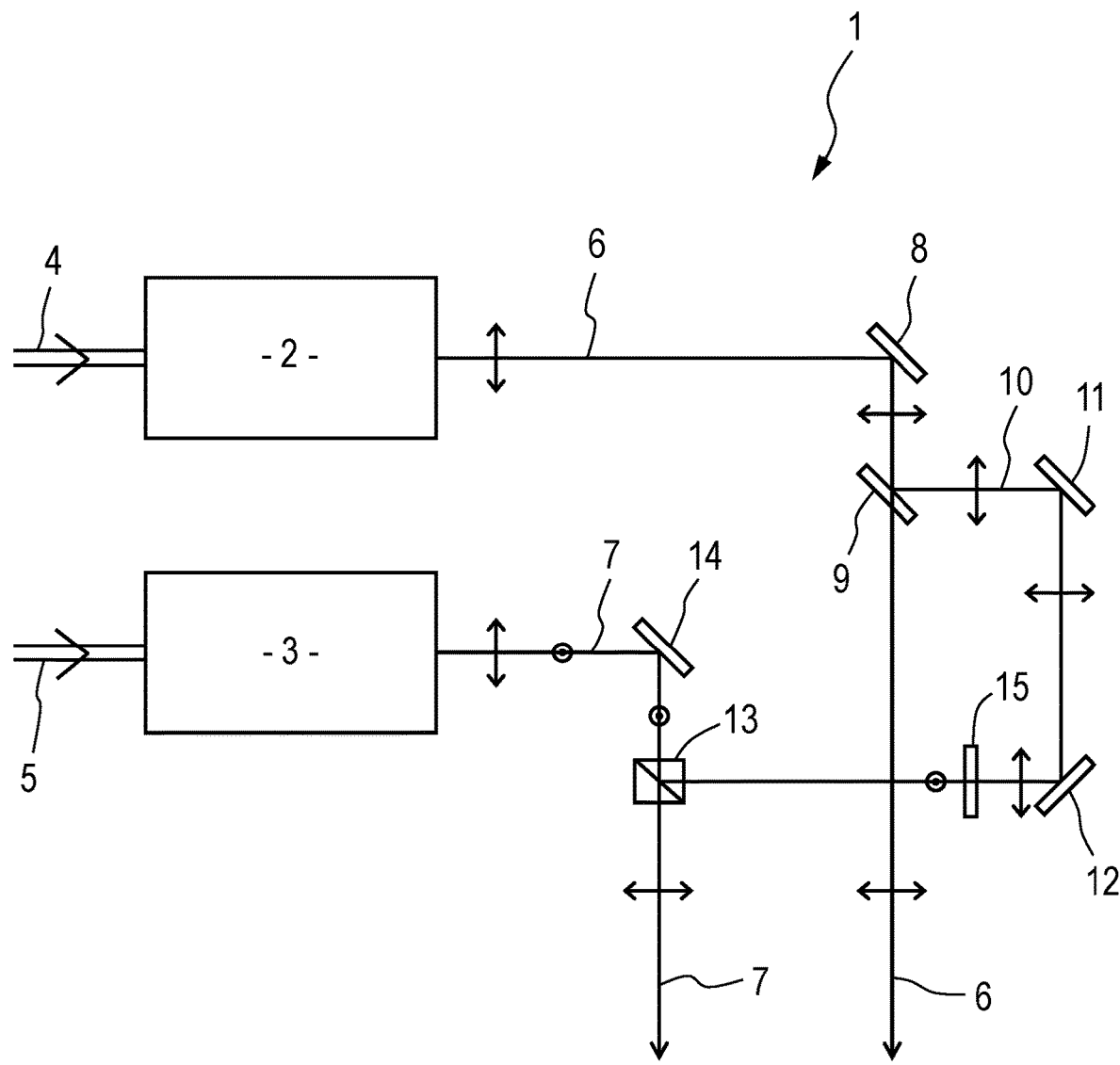
FIG. 1 presents a schematic representation of a repetition rate synchronised mode-locked laser system in accordance with an embodiment of the present invention.

In the description which follows, like parts are marked throughout the specification and drawings with the same reference numerals. The drawings are not necessarily to scale and the proportions of certain parts have been exaggerated to better illustrate details and features of embodiments of the invention.

DETAILED DESCRIPTION

Details of the method and apparatus for passively synchronising the repetition rate of two mode-locked lasers will now be described with reference to FIG. 1. In particular, FIG. 1 presents a schematic representation of a repetition rate synchronised mode-locked laser system in accordance with an embodiment of the present invention, as generally depicted by reference numeral 1.

The repetition rate synchronised mode-locked laser system 1 can be seen to comprise a first 2 and second 3 mode-locked Ti:sapphire lasers. The applicant's proprietary Sprite®-XT Ti:sapphire lasers are suitable examples of such mode-locked Ti:sapphire lasers. Given that the optical absorption within Ti:Sapphire occurs over a broad wavelength range from ~400 nm to ~600 nm, the mode-locked Ti:sapphire lasers 2 and 3 can be optically pumped by any commercially available continuous-wave "green" laser e.g. a 532 nm diode pumped solid-state laser source (not shown).

In FIG. 1 pump fields, depicted by reference numerals 4 and 5 are directed into the first 2 and second 3 mode-locked Ti:sapphire lasers, respectively, so as to generate corresponding output fields, depicted by reference numerals 6 and 7. With pump fields 4 and 5 having a power in the range of 6 to 12 Watts the output fields 6 and 7 of the mode-locked Ti:sapphire lasers 2 and 3 exhibit powers in the range of 0.7 Watts to 1.9 Watts across a tuning range of 720 nm to 980 nm. The pulse widths of the output fields 6 and 7 are of the order of 150 femtoseconds and exhibit a pulse repetition rate of approximately 79 MHz. The output fields 6 and 7 are also configured to have a horizontal polarisation i.e. a polarisation in the plane of the page of FIG. 1.

The repetition rate synchronised mode-locked laser system 1 can be seen to comprise a first beam steering mirror 8 employed to redirect the output field 6 towards beam splitter 9. The beam splitter is employed to pick off a synchronising optical field 10 from the first output field 6 that is subsequently redirected towards the second mode-locked Ti:sapphire laser 3. In the presently described embodiment, redirection of the synchronising optical field 10 to the second mode-locked Ti:sapphire laser 3 is achieved through the employment of second 11 and third 12 beam steering mirrors, a polarising beam splitter cube 13 and a fourth beam steering mirror 14. A half-wave plate 15 is preferably inserted into synchronising optical field 10 before the polarising beam splitter cube 13 in order to rotate the polarisation of the synchronising optical field 10, thus causing the synchronising optical field 10 to exit the half-wave plate 15 with a component of vertical polarisation i.e. a polarisation out of the plane of the page of FIG. 1. When the synchronising optical field 10 reaches the polarising beam splitter cube 13 the component with vertical polarisation is reflected towards the second mode-locked Ti:sapphire laser 3 while the component with horizontal polarisation passes straight through and ends up in a beam dump (not shown). This arrangement provides a means for adjusting the power of the synchronising optical field 10 that reaches the second mode-locked Ti:sapphire laser 3.

In the presently described embodiment the synchronising optical field 10 is redirected into the second mode-locked Ti:sapphire laser 3 via its output coupler. It will be appreciated by those skilled in the art that injection of the synchronising optical field 10 may be done through other alternative optical elements of the second mode-locked Ti:sapphire laser 3 e.g. an intracavity Brewster plate, another partial reflector (e.g. end mirror not being HR but having some significant transmission).

The synchronising optical field 10 redirected into the second mode-locked Ti:sapphire lasers 3 may be arranged to have a power as low as 50 mW. When the efficiency of the vertical polarisation injection is calculated, taking into account all the intracavity Brewster surfaces within the second mode-locked Ti:sapphire laser 3, the amount of the synchronising optical field 10 which interacts with the intracavity beam in the Ti:sapphire crystal in the second mode-locked Ti:sapphire laser 3 is of the order of 1%. of the injected power. In the presently described system this value is less than 1 mW.

It will be appreciated by the skilled reader that the second output field 7 which has a horizontal polarisation is redirected by the fourth beam steering mirror 14 before propagating, substantially undeviated, through the polarising beam splitter cube 13.

The applicants have discovered that supplying the synchronising optical field 10 as an optical drive signal to the second mode-locked Ti:sapphire lasers 3 causes passive synchronisation of the repetition rate of the output fields 6 and 7 of the two mode-locked Ti:sapphire lasers 2 and 3, with no further input being required on the part of the operator.

Figure 2:
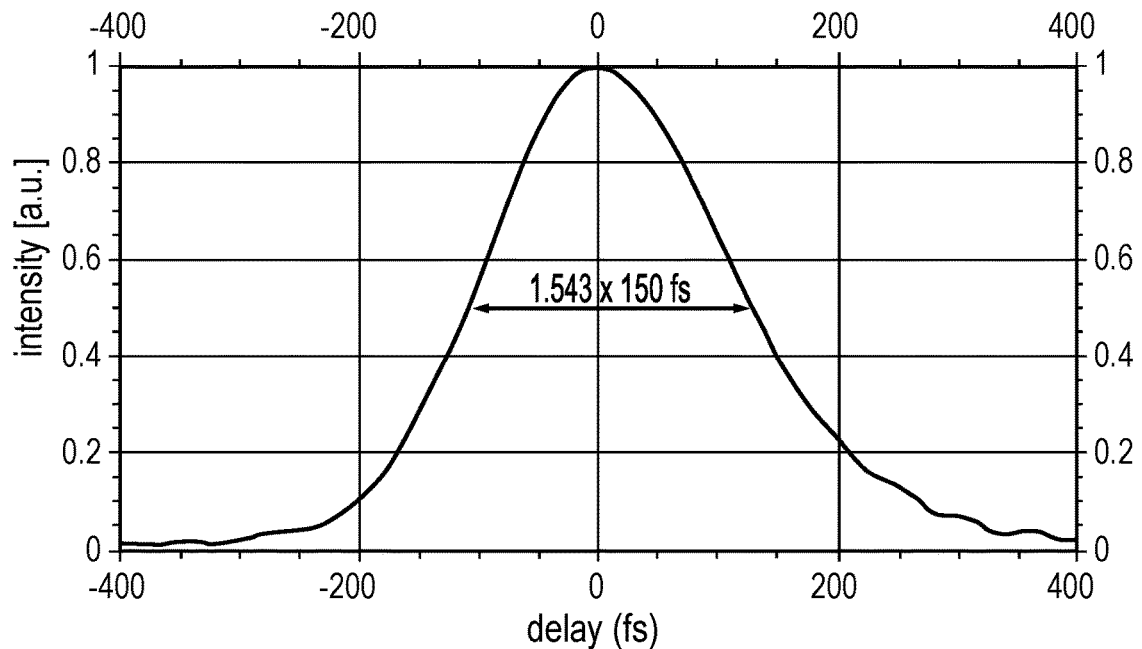
FIG. 2 presents a cross-correlation trace of the repetition rate synchronised mode-locked lasers of FIG. 1.
Figure 3:
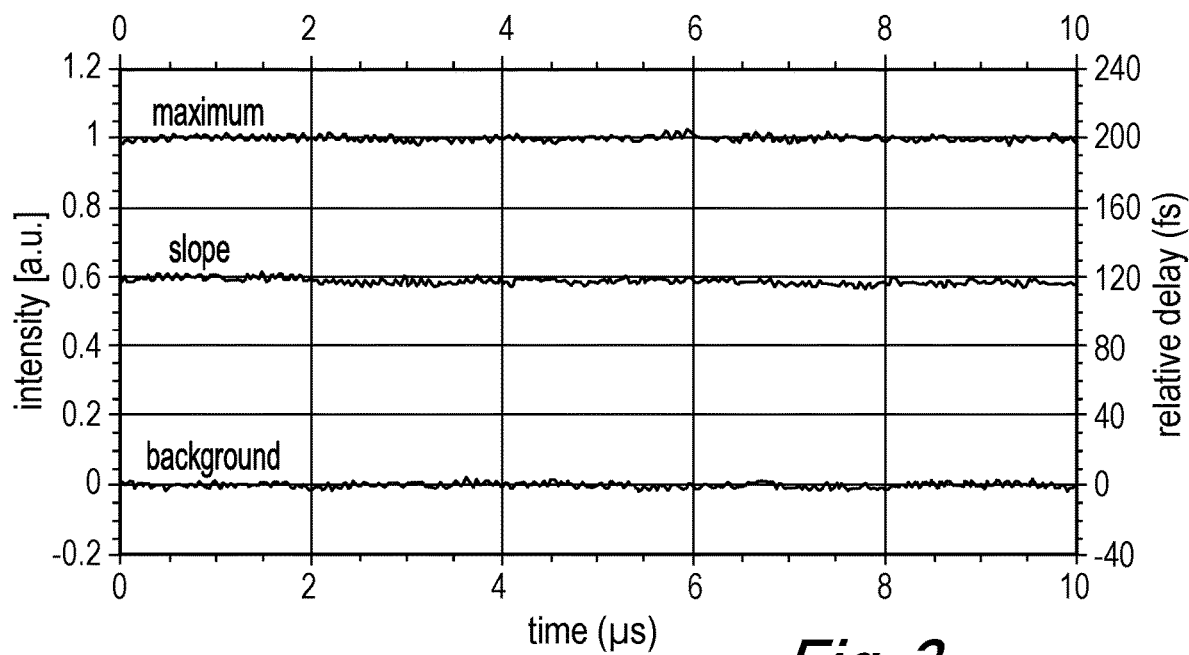
FIG. 3 presents a stability trace of the repetition rate synchronised mode-locked lasers of FIG. 1.

By way of example, when the output field 6 has a wavelength $\lambda_1=920$ nm, a pulse width of approximately 115 fs and $\Delta\lambda_1=8$ nm, and output field 7 a wavelength $\lambda_2=720$ nm, a pulse width of approximately 160 fs and $\Delta\lambda_2=3.5$ nm the experimental traces presented in FIGS. 2 and 3 were recorded. In particular, FIG. 2 presents a cross-correlation trace of the repetition rate synchronised mode-locked lasers 2 and 3. This trace highlights the high level of stability and overlap between the output fields 6 and 7.

FIG. 3 presents a stability trace of the repetition rate synchronised mode-locked lasers 2 and 3. Here the vertical scale is calibrated based on the scanned slope. The RMS values of these curves are then calculated which are representative of their respective jitter values. The background jitter is artificial and therefore must be subtracted from any non-zero signal. Following this methodology provides an RMS jitter value of 1.44 fs for the slope and 1.18 fs for the background, thus giving an estimated RMS jitter value of 0.26 fs.

This repetition rate synchronisation of the mode-locked lasers 2 and 3 is highly repeatable providing jitter values below 1 fs with corresponding time-bandwidth products of the two pulses being close to the Fourier limit.

Although the above embodiment has been described with reference to the use of a synchronising optical field 10 having a linear polarisation, the synchronisation of the repetition rate of the output fields 6 and 7 is not limited in any way be the particular polarisation of the synchronising optical field 10 or the output fields 6 and 7. The employment of linear polarisation and the half-wave plate 15 has been used for simplification of understanding only. In alternative embodiments, the output fields 6 and 7 could have circular or elliptical polarisations and the half-wave plate 15 could be replaced by an alternative waveplate (e.g. a quarter wave plate) or removed completely from the system 1. Similarly, the output fields 6 and 7 do not need to share the same polarisation.

Significantly these results are achieved without any need for any electronics, moving parts or additional external generation of a feedback signal.

The above results are also found to be independent of the wavelength of the output fields 6 and 7. This means the methodology can be employed with any combination of known mode-locked lasers e.g. such as nonlinear crystal or fibre lasers based on Titanium-doped sapphire (Ti:sapphire), Chromium-doped forsterite (Cr:forsterite), Chromium-doped yttrium aluminium garnet (Cr:YAG$^3$), Ytterbium-doped calcium fluoride (Yb:CaF$_2$), Neodymium-doped yttrium orthovanadate (Nd:YVO$_4$), Ytterbium-doped potassium gadolinium tungstate (Yb:KGW), Ytterbium-doped potassium yttrium tungstate (Yb:KYW). It will be recognised by the skilled reader that the above nonlinear crystals and or fibre gain mediums may employ alternative, or combinations of known dopant elements e.g. Ytterbium (Yb), Neodymium (Nd), Erbium (Er), Chromium (Cr), Holmium (Ho), Titanium (Ti) and Thulium (Tm).

Figure 4:
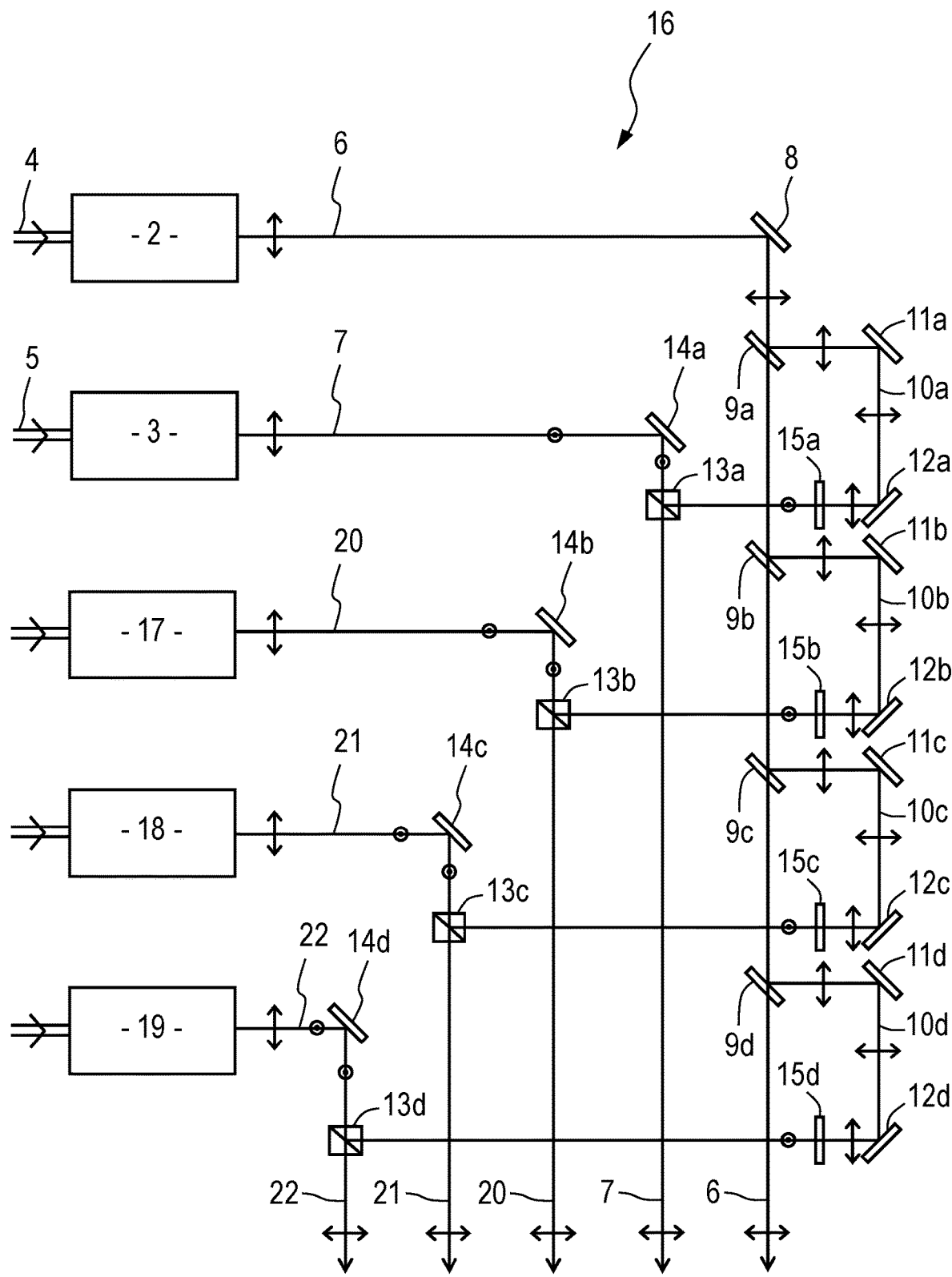
FIG. 4 presents a schematic representation of an alternative repetition rate synchronised mode-locked laser system in accordance with an alternative embodiment of the present invention.
Figure 5:
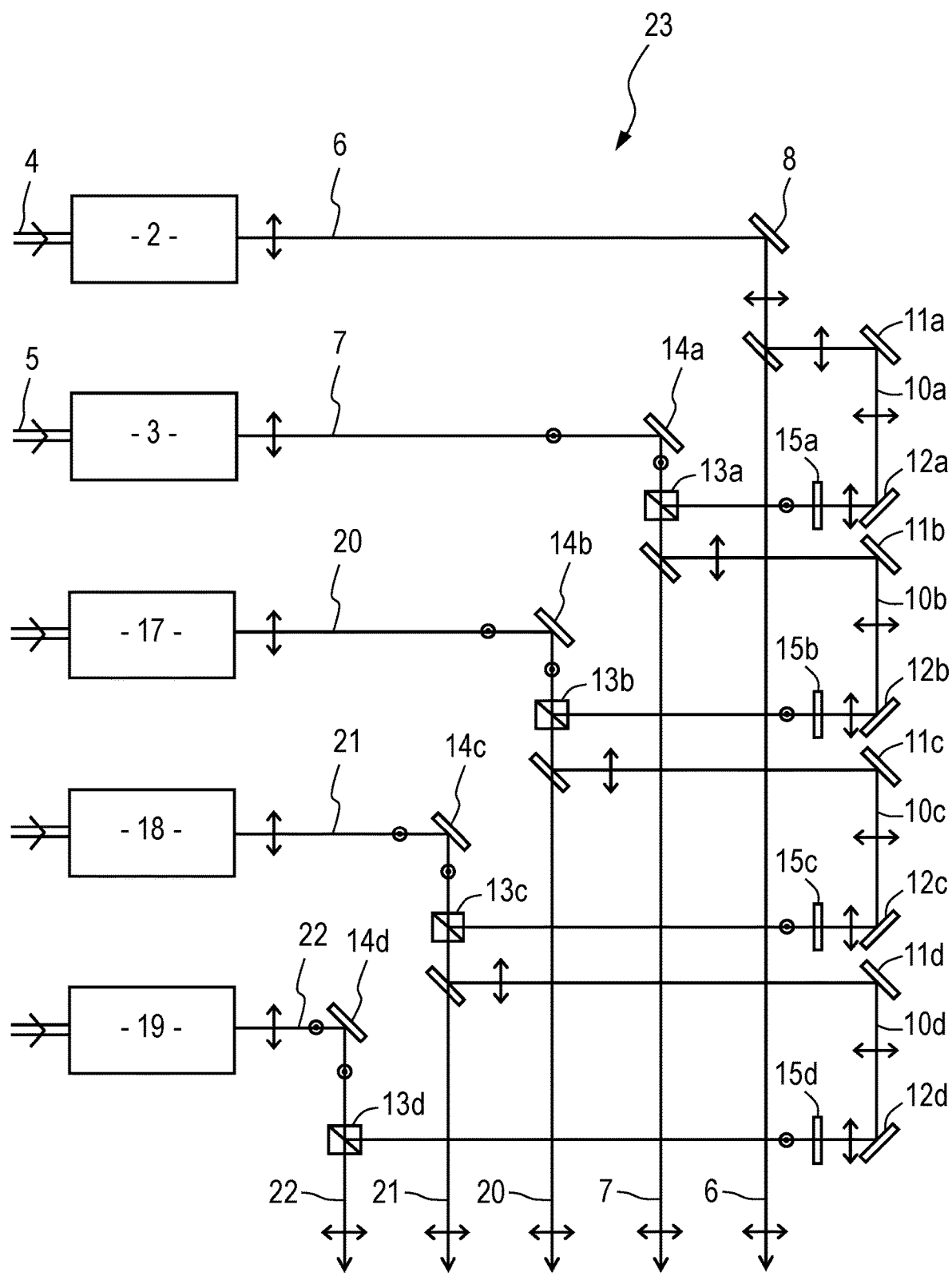
FIG. 5 presents a schematic representation of a repetition rate synchronised mode-locked laser system in accordance with a further alternative embodiment of the present invention.

The stability of the above described method and apparatus makes it highly scalable as will now be demonstrated with reference to FIGS. 4 and 5.

Employing the repetition rate synchronised mode-locked laser system 16. presented within FIG. 4 it has proved possible for five mode-locked Ti:sapphire lasers 2, 3, 17, 18 and 19 to have their output fields 6, 7, 20, 21 and 22 synchronised. This is achieved through the employment of four separate beam splitters 9a, 9b, 9c and 9d located within the output field 6 of the first mode-locked Ti:sapphire lasers 2. As a result, four synchronising optical fields 10a, 10b, 10c and 10d from the first output field 6 are produced that are subsequently redirected towards the second 3, third 17, fourth 18 and fifth 19 mode-locked Ti:sapphire lasers, respectively, in a similar manner to that described above with respect to the embodiment of FIG. 1.

In this arrangement the five mode-locked Ti:sapphire lasers 2, 3, 17, 18 and 19 are effectively arranged in parallel with the first mode-locked Ti:sapphire laser 2. As a result, if any of the Ti:sapphire lasers 3, 17, 18 and 19 were to fail, only the associated output field 7, 20, 21, and 22 would stop being synchronised with the others. However, in this system 16 there is the significant power requirement placed on the first mode-locked Ti:sapphire lasers 2 in generating the multiple synchronising optical fields 10. This power requirement effectively limits the number of mode-locked Ti:sapphire lasers that can be synchronised.

Employing the repetition rate synchronised mode-locked laser system 23. presented within FIG. 5 removes the power requirement placed on the first mode-locked Ti:sapphire lasers 2 in generating the multiple synchronising optical fields 10. It has again proved possible the five mode-locked Ti:sapphire lasers 2, 3, 17, 18 and 19 to have their output fields 6, 7, 20, 21, and 22 synchronised. This is again achieved through the employment of four separate beam splitters 9a, 9b, 9c and 9d however, unlike the embodiment of FIG. 4 only the first beam splitter 9a is located within the output field 6 of the first mode-locked Ti:sapphire laser 2. The first beam splitter 9a is again employed to generate synchronising optical field 10a that is subsequently redirected towards the second mode-locked Ti:sapphire laser 3 in a similar manner to that described above with reference to FIGS. 1 and 4. The three other beam splitters 9b, 9c and 9d are however located within the second 7, third 20 and fourth output fields 21, respectively. As a result, three further synchronising optical fields 10b, 10c and 10d from the second 7, third 20 and fourth output fields 21, respectively, are produced. The synchronising optical fields 10b, 10c and 10d are subsequently redirected towards the third 17, fourth 18 and fifth 19 mode-locked Ti:sapphire lasers, respectively, in a similar manner to that described above with respect to the embodiment of FIGS. 1 and 4.

In this arrangement the five mode-locked Ti:sapphire lasers 2, 3, 17, 18 and 19 are effectively arranged in series with each mode-locked Ti:sapphire lasers being arranged to synchronise the next mode-locked Ti:sapphire lasers in the series. In this way the power requirements placed on the first mode-locked Ti:sapphire lasers are removed and thus there is effectively no limit on the number of mode-locked Ti:sapphire lasers that can be synchronised. However, since the five mode-locked Ti:sapphire lasers 2, 3, 17, 18 and 19 are located in series, if one of the five mode-locked Ti:sapphire lasers 2, 3, 17, 18 and 19 were to fail then the synchronisation with all of the subsequent output fields 7, 20, 21, and 22 would also fail.

The above described methods and apparatus for synchronising mode-locked lasers offers a number of significant advantages over those systems known in the art. In the first instance, passive synchronisation of two or more mode-locked lasers may be achieved with timing jitter of less than 1 fs. In addition, the described methods are highly scalable with multiple mode-locked lasers being able to be coupled together is series or in parallel with the first mode-locked laser. When coupled in series there is effectively no upper limit to the number of mode-locked lasers that can be synchronised.

The described methods and apparatus are independent of the wavelengths at which the mode-locked lasers are operating. The means that the methods are not limited to use with any particular combination of mode-locked laser type.

As the described methods and apparatus are passive they do not require the employment of any electronics. The passive techniques also do not require the generation of any feedback signal, either electronical or optical using additional nonlinear optical crystals. As a result, the described methods and apparatus are significantly less complex than those known in the art and are not power limited by additional nonlinear optical processes.

A method and apparatus for passively synchronising the repetition rate of two or more mode-locked lasers is described. The method and apparatus involves forming a first synchronising optical field by separating a first portion of an output field of a first mode-locked laser and thereafter redirecting this synchronising optical field to form a driving signal for a second mode-locked laser. Employing these techniques results in systems with timing jitter of less than 1 fs. The method is also independent of the wavelengths and polarisation at which the mode-locked lasers operate and so is not limited to use with any particular type of mode-locked laser. Since the method and apparatus is passive it does not require the employment of any electronics, variable time delay paths or additional nonlinear optical crystals. As a result, the method and apparatus is significantly less complex than those known in the art and are not power limited by additional nonlinear optical processes.

Throughout the specification, unless the context demands otherwise, the term "comprise" or "include", or variations such as "comprises" or "comprising", "includes" or "including" will be understood to imply the inclusion of a stated integer or group of integers, but not the exclusion of any other integer or group of integers.

Furthermore, reference to any prior art in the description should not be taken as an indication that the prior art forms part of the common general knowledge.

The foregoing description of the invention has been presented for purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

The invention claimed is:

1. A method for synchronising a repetition rate of two or more output fields of a mode-locked laser system comprising two or more mode-locked lasers, the method comprising:
   providing a first mode-locked laser;
   generating a first output field of the repetition rate, synchronized mode-locked laser system at a first wavelength $\lambda_1$ from the first mode-locked laser;
   providing a second mode-locked laser;
   generating a second output field of the repetition rate, synchronized mode-locked laser system at a second wavelength $\lambda_2$ from the second mode-locked laser, wherein the second wavelength $\lambda_2$ is different from the first wavelength $\lambda_1$;
   forming a first synchronising optical field by separating a first portion of the first output field of the first mode-locked laser; and
   redirecting the first synchronising optical field to form an optical feedback signal for the second mode-locked laser;
   wherein the method results in the laser system generating both a first output field at the first wavelength $\lambda_1$ and a second output field at the second wavelength $\lambda_2$.

2. A method for synchronising a repetition rate of two or more output fields of a mode-locked laser system as claimed in claim 1 wherein the first synchronising optical field is redirected into the second mode-locked laser via an output coupler or end mirror of the second mode-locked laser.

3. A method for synchronising a repetition rate of two or more output fields of a mode-locked laser system as claimed in claim 1 wherein the first synchronising optical field is redirected into the second mode-locked laser via an intracavity element of the second mode-locked laser.

4. A method for synchronising a repetition rate of two or more output fields of a mode-locked laser system as claimed in claim 1 wherein the first and second output fields have the same polarisation.

5. A method for synchronising a repetition rate of two or more output fields of a mode-locked laser system as claimed in claim 4 wherein the first and second output fields are linearly polarised.

6. A method for synchronising a repetition rate of two or more output fields of a mode-locked laser system as claimed in claim 4 wherein a polarisation of the first synchronising optical field is the same as the polarisation of the first output field of the first mode-locked laser.

7. A method for synchronising a repetition rate of two or more output fields of a mode-locked laser system as claimed in claim 6 wherein redirecting the first synchronising optical field further comprises varying the polarisation of the first synchronising optical field.

8. A method for synchronising a repetition rate of two or more output fields of a mode-locked laser system as claimed in claim 7 wherein varying the polarisation of the first synchronising optical field comprises rotating the polarisation of the first synchronising optical field through 90°.

9. A method for synchronising a repetition rate of two or more output fields of a mode-locked laser system as claimed in claim 1 wherein the method further comprises forming one or more additional synchronising optical fields by separating one or more additional portions of the first output field of the first mode-locked laser.

10. A method for synchronising a repetition rate of two or more output fields of a mode-locked laser system as claimed in claim 9 wherein the method further comprises redirecting the one or more additional synchronising optical fields to form an optical feedback signal for one or more additional mode-locked lasers.

11. A method for synchronising a repetition rate of two or more output fields of a mode-locked laser system as claimed in claim 10 wherein the one or more additional synchronising optical fields are redirected into the one or more additional mode-locked lasers via an output coupler or end mirror of the one or more additional mode-locked lasers.

12. A method for synchronising a repetition rate of two or more output fields of a mode-locked laser system as claimed in claim 10 wherein the one or more additional synchronising optical fields are redirected into the one or more additional mode-locked lasers via an intracavity element of the one or more additional mode-locked lasers.

13. A method for synchronising a repetition rate of two or more output fields of a mode-locked laser system as claimed in claim 9 wherein a polarisation of the one or more additional synchronising optical fields is the same as the polarisation of the first output field of the first mode-locked laser.

14. A method for synchronising a repetition rate of two or more output fields of a mode-locked laser system as claimed in claim 13 wherein redirecting the one or more additional synchronising optical fields further comprises varying the polarisation of the one or more additional synchronising optical fields.

15. A method for synchronising a repetition rate of two or more output fields of a mode-locked laser system as claimed in claim 14 wherein varying the polarisation of the one or more additional synchronising optical fields comprises rotating the polarisation of one or more of the additional synchronising optical fields through 90°.

16. A method for synchronising a repetition rate of two or more output fields of a mode-locked laser system as claimed in claim 1 wherein the method further comprises forming an nth synchronising optical field by separating a first portion of an output field of an nth mode-locked laser, wherein n is an integer greater than 1.

17. A method for synchronising a repetition rate of two or more output fields of a mode-locked laser system as claimed in claim 16 wherein the method further comprises redirecting the nth synchronising optical field to form an optical feedback signal for an nth+1 mode-locked laser.

18. A method for synchronising a repetition rate of two or more output fields of a mode-locked laser system as claimed in claim 16 wherein a polarisation of the nth synchronising optical field is the same as the polarisation of the output field of the nth mode-locked laser.

19. A method for synchronising a repetition rate of two or more output fields of a mode-locked laser system as claimed in claim 18 wherein the nth synchronising optical field is redirected into the nth+1 mode-locked laser via an output coupler or end mirror of the nth+1 additional mode-locked laser.

20. A method for synchronising a repetition rate of two or more output fields of a mode-locked laser system as claimed in claim 18 wherein the nth synchronising optical field is redirected into the nth+1 mode-locked laser via an intracavity element of the one or more additional mode-locked lasers.

21. A method for synchronising a repetition rate of two or more output fields of a mode-locked laser system as claimed in claim 18 wherein redirecting the nth synchronising optical field further comprises varying the polarisation of the nth synchronising optical field.

22. A method for synchronising a repetition rate of two or more output fields of a mode-locked laser system as claimed in claim 21 wherein varying the polarisation of the nth synchronising optical field comprises rotating the polarisation of the nth synchronising optical field through 90°.

23. A repetition rate synchronised mode-locked laser system, the system comprising:
 a first mode-locked laser that generates a first output field of the repetition rate synchronized mode-locked laser system at a first wavelength $\lambda_1$;
 a second mode-locked laser that generates a second output field of the repetition rate synchronized mode-locked laser system at a second wavelength $\lambda_2$, wherein the second wavelength $\lambda_2$ is different from the first wavelength $\lambda_1$;
 a beam splitter that provides a means for forming a first synchronising optical field by separating a first portion of the first output field of the first mode-locked laser; and
 one or more beam steering optics that provide a means for redirecting the first synchronising optical field to form an optical feedback signal for the second mode-locked laser;
 wherein the laser system generates both a first output field at the first wavelength $\lambda_1$ and a second output field at the second wavelength $\lambda_2$.

24. A repetition rate synchronised mode-locked laser system as claimed in claim 23 wherein the first synchronising optical field is redirected into the second mode-locked laser via an output coupler or end mirror of the second mode-locked laser.

25. A repetition rate synchronised mode-locked laser system as claimed in claim 23 wherein the first synchronising optical field is redirected into the second mode-locked laser via an intracavity element of the second mode-locked laser.

26. A repetition rate synchronised mode-locked laser system as claimed in claim 23 wherein the first and second output fields have the same polarisation.

27. A repetition rate synchronised mode-locked laser system as claimed in claim 26 wherein the first and second output fields are linearly polarised.

28. A repetition rate synchronised mode-locked laser system as claimed in claim 26 wherein a polarisation of the first synchronising optical field is the same as the polarisation as the first output field of the first mode-locked laser.

29. A repetition rate synchronised mode-locked laser system as claimed in claim 28 wherein the repetition rate synchronised mode-locked laser system further comprises a waveplate that provides a means for varying the polarisation of the first synchronising optical field.

30. A repetition rate synchronised mode-locked laser system as claimed in claim 29 wherein the waveplate comprises a half-wave plate.

31. A repetition rate synchronised mode-locked laser system as claimed in claim 23 wherein the repetition rate synchronised mode-locked laser system further comprises one or more additional beam splitters that provide a means for forming one or more additional synchronising optical fields by separating one or more additional portions of the first output field of the first mode-locked laser.

32. A repetition rate synchronised mode-locked laser system as claimed in claim 31 wherein the repetition rate synchronised mode-locked laser system further comprises one or more beam steering optics that provide a means for redirecting the one or more additional synchronising optical fields to form an optical feedback signal for one or more additional mode-locked lasers.

33. A repetition rate synchronised mode-locked laser system as claimed in claim 31 wherein one or more additional synchronising optical fields are redirected into the one or more additional mode-locked lasers via an output coupler or end mirror of the one or more additional mode-locked lasers.

34. A repetition rate synchronised mode-locked laser system as claimed in claim 31 wherein one or more additional synchronising optical fields are redirected into the one or more additional mode-locked lasers via an intracavity element of the one or more additional mode-locked lasers.

35. A repetition rate synchronised mode-locked laser system as claimed in claim 31 wherein a polarisation of the one or more additional synchronising optical fields is the same as the polarisation of the first output field of the first mode-locked laser.

36. A repetition rate synchronised mode-locked laser system as claimed in claim 35 wherein the repetition rate synchronised mode-locked laser system further comprises one or more additional waveplates that provide a means for varying the polarisation of the one or more additional synchronising optical fields.

37. A repetition rate synchronised mode-locked laser system as claimed in claim 36 wherein the one or more additional waveplates comprise half-wave plates.

38. A repetition rate synchronised mode-locked laser system as claimed in claim 23 wherein the repetition rate synchronised mode-locked laser system further comprises one or more additional beam splitters that provide a means for forming an nth synchronising optical field by separating a first portion of an output field of an nth mode-locked laser, wherein n is an integer greater than 1.

39. A repetition rate synchronised mode-locked laser system as claimed in claim 38 wherein the repetition rate synchronised mode-locked laser system further comprises one or more beam steering optics that provide a means for the nth synchronising optical field to form an optical feedback signal for an nth+1 mode-locked laser.

40. A repetition rate synchronised mode-locked laser system as claimed in claim 39 wherein the nth synchronising optical field is redirected into the nth+1 mode-locked laser via an output coupler or end mirror of the nth+1 additional mode-locked laser.

41. A repetition rate synchronised mode-locked laser system as claimed in claim 39 wherein the nth synchronising optical field is redirected into the nth+1 mode-locked laser via an intracavity element of the one or more additional mode-locked lasers.

42. A repetition rate synchronised mode-locked laser system as claimed in claim 38 wherein a polarisation of the nth synchronising optical field is the same as the polarisation of the output field of the nth mode-locked laser.

43. A repetition rate synchronised mode-locked laser system as claimed in claim 42 wherein the repetition rate synchronised mode-locked laser system further comprises one or more additional waveplates that provide a means for varying the polarisation of the nth synchronising optical fields.

44. A repetition rate synchronised mode-locked laser system as claimed in claim 43 wherein the one or more additional waveplates comprise half-wave plates.

* * * * *